United States Patent [19]

Krasney

[11] Patent Number: 4,460,279
[45] Date of Patent: Jul. 17, 1984

[54] LIQUID PITCHER WITH MIXER

[76] Inventor: Robert L. Krasney, 737 N. Kilkea Dr., Los Angeles, Calif. 90046

[21] Appl. No.: 411,412

[22] Filed: Aug. 25, 1982

[51] Int. Cl.³ .............................................. B01F 7/22
[52] U.S. Cl. ................................................... 366/247
[58] Field of Search ............... 366/247, 248, 249, 250, 366/251, 252, 253, 343

[56] References Cited

U.S. PATENT DOCUMENTS

| | | |
|---|---|---|
| 197,674 | 10/1877 | Shipe . |
| 1,791,041 | 2/1931 | Sawyer . |
| 1,926,655 | 9/1933 | Shaw .................................... 366/248 |
| 2,061,547 | 11/1936 | Bumpus ................................ 366/247 |
| 2,501,016 | 3/1950 | Woodman ............................ 366/247 |
| 2,858,196 | 10/1958 | Ballard ............................. 366/247 X |
| 2,898,094 | 8/1959 | O'Neill, Jr. . |
| 3,175,808 | 3/1965 | Dedoes . |
| 4,160,602 | 7/1979 | Benz et al. . |
| 4,253,773 | 3/1981 | Aho et al. . |
| 4,359,283 | 11/1982 | McClellan ........................... 366/247 |

Primary Examiner—Robert W. Jenkins
Assistant Examiner—Arthur D. Dahlberg
Attorney, Agent, or Firm—Maky, Renner, Otto & Boisselle

[57] ABSTRACT

A liquid pitcher has an integral mixer system/stirrer assembly for mixing liquids directly in the pitcher without shaking or spilling. The pitcher includes a pitcher container and a cover. The mixer itself includes one or more mixing elements mounted on a shaft that extends through an opening in the cover, on the one hand, to position and to permit positioning of the mixing element in the pitcher and, on the other hand, to help fix the shaft at a location relative to the cover and pitcher when the cover is properly placed on the pitcher. Importantly, a handle attached to the shaft outside the pitcher, when the cover is installed thereon, cooperates with the opening that secures the shaft in position and with a mating rim about the cover to guide the handle during such rotation to assure proper positioning of the shaft and mixing element and to avoid excessive wearing of various portions of the assembly during mixing operation. Preferably such rim is a convex or concave annular surface and the handle has a corresponding portion for closely fitting such rim as the handle turns about the cover.

14 Claims, 4 Drawing Figures

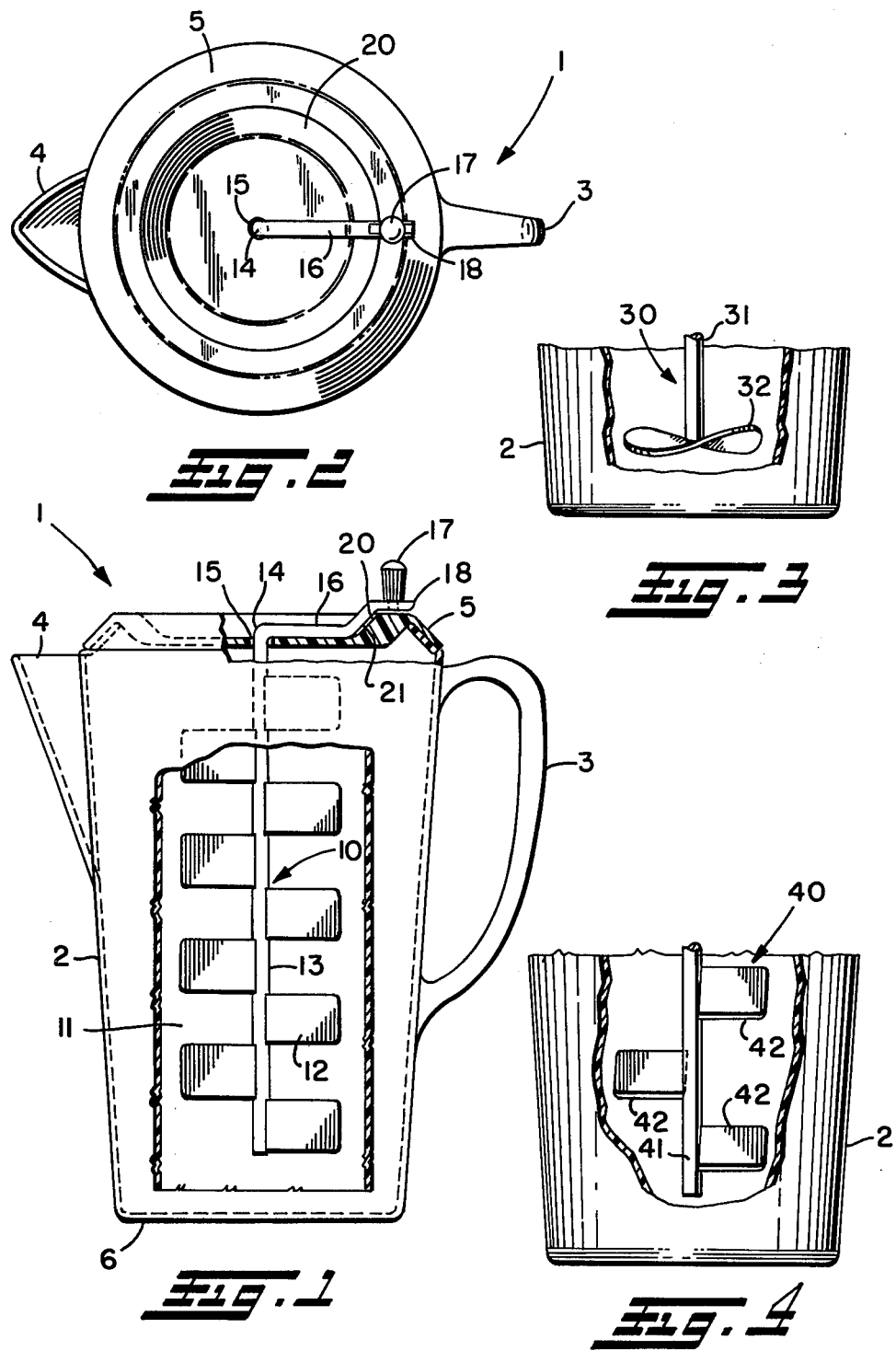

LIQUID PITCHER WITH MIXER

TECHNICAL FIELD

The present invention relates generally, as indicated, to fluid containers, and, more particularly, to a liquid pitcher with a mixer/stirrer assembly associated therewith.

BACKGROUND OF PRIOR ART

Many pitchers today are made of plastic material, and, as is well known, some of those pitchers tend to wear out too soon. For example, the top may not fit well after some use so that when the pitcher is shaken, the liquid therein escapes or spills. Some liquids should not be shaken thoroughly, but rather should be stirred gently. To stir the same, it is necessary to remove the cover for access to the liquid in the pitcher, which may be undesirable for reasons, such as, for example, cleanliness, temperature exposure, spillage, unnecessary steps, etc.

Various mixer devices have been available in the past, such as paint mixers, churns, ice cream freezers, and even multi-function devices for shipping, storing and mixing fluids therein. However, in those prior devices in which mixing elements in a mixing zone are supported by a shaft that extends outside the mixing zone, and the shaft is intended to receive a rotary force or moment to turn the same outside the mixing zone, there is usually required reinforcement or substantial support structure for the shaft where it exits the mixing zone. On a plastic pitcher, though, the ability to have such a strong reinforcing support works contra the desire to minimize the quantity of the material required to make the pitcher and the brittleness of that material; indeed, the more rigid the reinforcing mechanism for the shaft support, the greater will be the brittle nature of the container and the likelihood thereof if break if dropped, for example.

SUMMARY OF THE INVENTION

In accordance with the present invention a pitcher has a mixer or stirrer assembly directly associated therewith. The pitcher includes a pitcher container with a covering or supported top portion. The stirrer assembly includes one or more mixing elements for mixing fluid material in the pitcher, a mount, such as a shaft, for the mixing element(s), a positioner for positioning the mount and mixing element(s) in position in the pitcher container for mixing material there, a handle preferably outside the container and above the mount for turning the mount and mixing element(s), and a support for the handle at a position thereof removed from the area at which the handle is coupled to the mount so that during application of force to the handle and/or mount, such support accomodates at least some of that force directly vertically toward the upstanding walls and thereinto to avoid undue stresses in the cover during stirrer assembly rotation.

The stirrer assembly allows material to be stirred or mixed in the pitcher without spillage, splash, etc.

With the foregoing and following description in mind, a primary object of the present invention is to mix fluids, especially liquids, in a pitcher or other container without spilling the same.

Another object is to improve pitchers.

An additional object is to strengthen the stirrer mechanism in a stirring type container.

A further object is to minimize stress on a pitcher lid during stirring by a stirrer assembly therein.

Even another object is to provide improvements in the stirrer assembly for a pitcher or like container.

Even an additional object is to improve the ability to stir fluid materials in a pitcher like container.

Even a further object is to improve the apparent and actual integrity of a stirrer assembly and particularly of the same used in connection with a pitcher or like container.

Briefly, in accordance with one aspect of the invention, a stirrer assembly for a pitcher includes a mixing device for mixing fluid-like material in the pitcher, a mounting device for mounting the mixing device, a positioning device for positioning device and mounting device in position in the pitcher for mixing material therein, a handle for turning the mixing device and mounting device, and a support for supporting the handle at a position thereof removed from a coupling area of the handle and the mounting device during application of force thereto to effect such turning.

According to another aspect, a liquid pitcher includes a pitcher container, one or more mixing element(s) for mixing fluid-like material in the pitcher, a mount for mounting the mixing element(s) in the container, a positioner for positioning the element(s) and the mount in position in the container for mixing material therein, a handle accessible outside the container for turning the mixing element(s) and mount, and a support for supporting the handle relative to the container and at a position on the handle removed from a coupling area of the handle and the mount during application of force thereto to effect such turning.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side view, partly broken away in section of a pitcher with a stirrer assembly in accordance with the present invention;

FIG. 2 is a top plan view of the pitcher showing the cover and mixer handle;

FIG. 3 is a fragmentary schematic view showing a propeller type mixer; and

FIG. 4 is a fragmentary schematic view of a mixer with slopped mixing elements thereon.

DESCRIPTION OF THE PREFERRED EMBODIMENT

Referring now in detail to the drawing, wherein like reference numerals designate like parts in the several figures, and initially to FIGS. 1 and 2, a pitcher in accordance with the present invention is generally indicated at 1. The pitcher 1 includes a cylindrical, conical or other shape hollow pitcher container 2 having a handle 3 and a spout 4. A cover or lid 5 closes the otherwise open top of the container 2. Alternatively, if desired, the cover 5 may be replaced by a top that is integral with the pitcher container or is partly open, such as a member extending across at least part of the open top of the pitcher container 2. Preferably the pitcher container 2 and cover 5 are formed of plastic or other material, for example made by a molding technique. The pitcher container 2 and cover 5 are formed of a material that has suitable strength and rigidity to hold shape. The pitcher container 2 and cover 5 also have adequate resilient characteristics to avoid breakage, for example when dropped, and to enable, in particular, the cover and container to fit reasonably well without the need for exacting tolerances.

The bottom 6 of the pitcher container 2 is flat, or at least has a flat rim portion so that the pitcher can rest without rocking on a flat surface. The handle 3 and spout 4 are so arranged that the pitcher can be used in usual fashion for dispensing liquid (or other fluid or fluid-like material) therefrom. The cover 5 preferably is removable and fits reasonably securely to the pitcher container 2 so that it will not too easily come loose and may be snap fit, screw threaded, or simply resiliently held in place, as may be desired.

Turning now to the stirrer assembly 10, which is partly in the container interior 11, such assembly includes one, and preferably a plurality of, mixing elements 12, such as the flap-like projections shown, a shaft 13 on which the mixing elements are mounted, an exposed end 14 of the shaft 13, which protrudes through an opening 15 in the cover 5, and a handle 16. The handle 16 may be attached to the shaft 13 by being integrally molded therewith or, alternatively, by conventional fastening means (not shown). A knob 17 may be attached to the end of the handle 18 remote from the exposed end 14 of the shaft 13.

Preferably the mixing elements 12 and shaft 13 are integrally molded as a single part made of plastic or like material. Alternatively, the individual mixing elements 12 may be fastened to the shaft 13 by conventional means (not shown). Preferably, too, the mixing elements 12, shaft 13, and handles 16 are integrally molded as a single piece, for example of plastic material. Such stirrer assembly 10, then, may be inserted through the opening 15 in the cover 5. Specifically, with the knob 17 removed, the handle end 18 could be inserted through the opening 15 at an orientation perpendicular to the overall major planar extent of the cover 5 until the bend at the shaft end 14 is reached. Then, the stirrer assembly 10 could be pivoted or rotated slightly to bring through the opening 15 the balance of that exposed end 14, as may be necessary and appropriate to have exposed through the opening 15. Thereafter, the knob 17 could be attached to the end 18 of the handle 16.

A support 20 for the handle 16 is included as part of the cover 5. The support 20 in the preferred embodiment is a convex annular rim or ridge that circumscribes approximately the outer circumference of the top portion of the cover 5. Such annular rim is relatively strong in itself and also iwhen the cover 5 is on the pitcher container 2 such rim becomes an effective extension of the generally vertical walls of the pitcher container 2 directly below the support 20. Alternatively, the support 20 may be a recess or other shape that preferably extends wholly circumferentially about an opening 15 through the cover 5 being at a constant radial distance from such opening.

The handle 16 also has a follower portion 21 intended to follow the support 20 during rotation of the handle to turn the overall stirrer assembly 10 and in particular the mixing elements 12. The follower 21 has a configuration that mates relatively closely with the configuration of the support 20, i.e. both are coplanar at an obtuse angle with respect to the plane of the cover proximate the opening 15 and at an acute angle with respect to the vertical or axial direction of the major side wall of the pitcher container 2, as is seen most clearly in FIG. 1; and the two cooperate with each other and with the opening 15 to restrict radial movement of the shaft 13 and handle 16 to assure proper positioning of the handle and overall stirrer assembly 10 with respect to both the cover 5 and the pitcher container 2. Thus, the shaft 13 is positioned generally on axis with the opening 15 and with the pitcher container 2 so that the mixing elements 12 may rotate in a prescribed manner, preferably without engaging the interior side walls of the pitcher container 2. (However, such engagement may occur when a wiping action is desired, and even in that event the aforedescribed accurate stirrer assembly positioning arrangement would help to balance such wiping forces, for example.)

The support 20 and follower 21 also cooperate to receive the vertically directed force applied when a person is pressing downward on the handle 16 while also turning the same, thus preventing unnecessary force application to weaker portions of the cover or portions of the cover 5 that are unsupported by the walls of the pitcher container 2. Moreover, due to the interrelationship of the support 20 and follower 21 with each other and with the opening 15, which prohibits radial movement of the handle 16 and movement of the shaft 13 angularly with respect to the axis through the opening 15, the need for a further support, bearing, reinforcement, etc. for the shaft 13 at the opening 15 can be reduced, if not eliminated entirely.

In using the pitcher 1 according to the present invention, the stirrer assembly 10 may be assembled with respect to the cover 5, as aforesaid. Fluid, such as concentrated orange juice and water, alcoholic beverage and mix, medicinal mix, etc. or other liquid or fluid-like material, may be placed in the container 2 and the cover 5 with the stirrer assembly attached thereto placed on and in the container, respectively, generally as shown in FIG. 1. The handle 16 may be turned manually causing the mixing elements 12 to mix the fluid in the container. Thereafter, without removing the cover 5 or stirrer assembly 10, the material in the container 2 may be poured from the spout 4 in conventional manner.

Referring briefly to FIG. 3, a portion of a modified stirrer assembly 30 is shown in a pitcher container 2 of the type shown in FIG. 1. The cover 5, stirrer assembly 16, and so on, are not shown in FIG. 3, although they may be the same as those parts illustrated in FIGS. 1 and 2. At the bottom of the shaft 31 of the modified mixing stirrer assembly 30 is a propeller type mixing element 32. Such propeller type mixing element 32 may be of the type used in a conventional food blender or other similar type of mixing elements that tends to cause a certain flow pattern of the type produced by a propeller type mixer of conventional design, including, for example, vertical and radial flow. It will be appreciated that the modified stirrer assembly 10 may be substituted for use in combination with the stirrer assembly 10 of FIGS. 1 and 2.

Briefly referring to FIG. 4, a still further modified stirrer assembly 40 is shown in a pitcher container 2 of the type described above with reference to FIG. 1. Such container 2, then, would include a cover 5 and the further modified stirrer assembly 40 would include the remaining portions of the support shaft 41 and a handle, such as the handle 16 described above with reference to FIG. 1. Importantly, the mixing elements 42 of the further modified stirrer assembly 40 are positioned at an angle that is askew relative to a plane through the central axis of the shaft 41. Such angularly oriented mixing elements 42, then, provide a vertical vector as well as a radial vector of force application to fluid in the pitcher container 2 during rotation of the further modified stirrer assembly 40. It will be appreciated that the further modified stirrer assembly 40 may be used in place of or in combination with the stirrer assembly 10 and/or modified stirrer assembly 30 described above, respectively, with reference to FIGS. 1 and 3.

STATEMENT OF INDUSTRIAL APPLICATION

It will be appreciated that the pitcher and stirrer assembly in accordance with the present invention may be used to store, to mix, and to pour fluids preferably without spilling, splashing, or the like.

I claim:

1. A stirrer assembly for a pitcher, comprising mixing means for mixing fluid-like material in such pitcher, mounting means for mounting said mixing means, positioning means for positioning said mixing means and mounting means in position in such pitcher for mixing material therein, handle means for turning said mixing means and mounting means, support means for supporting said handle means at a position thereof removed from a coupling area of said handle means and said mounting means during application of force thereto to effect such turning, and a cover for such pitcher, said support means comprising an annular guide having a guide surface, said handle means having a follower surface positioned to follow said guide surface, said follower surface and guide surface being coplanar, located proximate each other, intended for engagement, and forming an obtuse angle with respect to the major planar extent of said cover and an acute angle with respect to the major axial wall direction of such pitcher, said guide surface and follower surface being cooperative to transmit externally applied vertical force from said handle means to such container wall and to restrict radial movement of said handle means during turning thereof about said guide.

2. A liquid pitcher, comprising a pitcher container, mixing means for mixing fluid-like material in such pitcher, mounting means for mounting said mixing means in said container, positioning means for positioning said mixing means and said mounting means in position in such pitcher for mixing material therein, handle means accessible outside said container for turning said mixing means and mounting means, support means for supporting said handle means relative to said container and at a position on said handle means removed from a coupling area of said handle means and said mounting means during application of force thereto to effect such turning, and a cover for such pitcher, said support means comprising an annular guide having a guide surface, said handle means having a follower surface positioned to follow said guide surface, said follower surface and guide surface being coplanar, located proximate each other, intended for engagement, and forming an obtuse angle with respect to the major planar extent of said cover and an acute angle with respect to the major axial wall direction of such pitcher, said guide surface and follower surface being cooperative to transmit externally applied vertical force from said handle means to such container wall and to restrict radial movement of said handle means during turning thereof about said guide.

3. The invention of claim 1 or 2, said mixing means including sloped surfaces to cause a vertical and a radial application of force to fluid during mixing by rotation of said mixing means.

4. The invention of claim 1 or 2, said mounting means comprising an elongate shaft.

5. The invention of claim 4, said mixing means further comprising plural blades mounted with respect to said shaft.

6. The invention of claim 4, said positioning means comprising a top for such pitcher, said top having an opening therethrough for holding said mounting means in position in such pitcher.

7. The invention of claim 1 or 2, said positioning means comprising a hole through a portion of such pitcher, and at least one of said handle and said mounting means protruding through said hole in axially parallel relation to a central axis of such pitcher.

8. The invention of claim 1 or 2, said guide comprising an annular ridge about a cover portion for such pitcher.

9. The invention of claim 1 or 2, said guide is positioned between the approximate center of said cover and an outside diameter of said cover or at such outside diameter of said cover, and said positioning means comprising an opening through said cover.

10. The invention of claim 9, said guide and said opening cooperatively interacting with said handle means to hold said handle means aligned in relatively radial position with respect to said hole.

11. The invention of claim 10, said mounting means comprising an elongate shaft, and said handle means having a shaft, and further comprising means for holding said handle means and shaft in relatively fixed relation, and wherein at least one of said handle means and shaft has a portion that extends through said hole for holding said handle means, mounting means, and mixing means in position that is aligned relative to the axis of such pitcher that extends through said hole.

12. The invention of claim 1, said stirrer assembly comprising plastic-like material.

13. The invention of claim 2, said pitcher comprising plastic-like material.

14. The invention of claim 1 or 2, said mixing means comprising a propeller type mixing element.

* * * * *